(12) United States Patent
Pennock

(10) Patent No.: US 7,788,158 B2
(45) Date of Patent: Aug. 31, 2010

(54) DYNAMIC PARI-MUTUEL MARKET

(75) Inventor: David M. Pennock, Pasadena, CA (US)

(73) Assignee: YAHOO! Inc., Sunnyvale, CA (US)

( * ) Notice: Subject to any disclaimer, the term of this patent is extended or adjusted under 35 U.S.C. 154(b) by 1384 days.

(21) Appl. No.: 10/770,590

(22) Filed: Feb. 3, 2004

(65) Prior Publication Data

US 2005/0171878 A1 Aug. 4, 2005

(51) Int. Cl.
*G06Q 40/00* (2006.01)
(52) U.S. Cl. ....................................................... 705/37
(58) Field of Classification Search .................... 705/37
See application file for complete search history.

(56) References Cited

U.S. PATENT DOCUMENTS 5,687,968 A * 11/1997 Tarantino ..................... 273/139
2005/0124408 A1 * 6/2005 Vlazny et al. .................. 463/28

OTHER PUBLICATIONS

Hanson, Robin, "Combinatorial Information Market Design", Information Systems Frontiers; Jan. 2003; 5, 1; ABI/INFORM Global p. 107.*

* cited by examiner

*Primary Examiner*—James A Kramer
*Assistant Examiner*—Eric T Wong
(74) *Attorney, Agent, or Firm*—Seth H. Ostrow, Esq.; Ostrow Kaufman & Frankl LLP

(57) ABSTRACT

The present invention provides a method of speculating on a future event or the value of an asset in a market. The speculating may take the form of trading, hedging or wagering. A plurality of speculations on the outcome of the future event is received. For each one of the speculations in the market, the status of the speculations at the time that the speculation was received in the market is recorded. After a time period for receiving speculations in the market has closed, the pari-mutuel payoff for each correct speculation is calculated using a computer. The pari-mutuel payoff depends at least in part on the status of speculations at the time that the speculation was received in the market.

37 Claims, 4 Drawing Sheets

DYNAMIC PARI-MUTUEL MARKET

COPYRIGHT NOTICE

A portion of this patent document contains material that is subject to copyright protection. The copyright owner has no objection to the facsimile reproduction by anyone of the patent document, as it appears in the Patent and Trademark Office patent files or records, but otherwise reserves all copyright rights whatsoever.

FIELD OF THE INVENTION

This invention generally relates to speculating in electronic markets or auctions. More particularly, the invention relates to electronic markets allowing trading, hedging or wagering on an outcome or on the value of assets or concepts.

BACKGROUND OF THE RELATED ART

There are various forms of speculating that are common economic activities. Trading and hedging are typically facilitated through financial markets, such as stocks, options, commodities, futures, derivatives, or insurance contracts. Wagering is typically facilitated through gambling markets, such as typical Las Vegas style sports wagering, conventional pari-mutuel betting at horse races, dog races, and jai alai games, political stock markets, or event-based futures markets (e.g., TradeSports.com). Even non-participating persons can benefit from the existence of such markets, since the going prices provide accurate forecasts of the likelihood of future outcomes. See, for example, the political stock markets known as Iowa Electronic Markets, and available at Web site http://www.biz.uiowa.edu/iem/, for instruments derived from political events.

In conventional pari-mutuel gambling, people place bets on which of two or more outcomes will occur at some time in the future. For simplicity, suppose there are two outcomes being wagered on: either a horse named "Alice" will win a race, or a horse named "Bob" will win. People bet money on one horse or the other. Suppose $800 is bet on Alice and $200 on Bob. Now suppose that Alice wins the race. The people who wagered on Bob lose their money ($200 in total). The people who bet on Alice win; these bettors receive all of their initial investment back, plus receive a portion of the money bet on Bob, in proportion to the amount they bet. In other words, every $1 bet on Alice entitles its owner to receive the initial $1 back, plus 1/800 of the $200 bet on Bob—so a $1 bet on Alice returns 1+200/800 dollars, or $1.25. In general, if there are n different outcomes (e.g., horses), and $M_1, M_2, \ldots, M_n$ dollars are bet on each outcome, and outcome i occurs, then everyone who bet on outcomes other than i loses, while every $1 bet on i receives the initial $1 back, plus $1/M_i$ of the total amount not wagered on i ($M_1+M_2+ \ldots +M_{i-1}+M_{i+1}+ \ldots +M_n$). In practice, there is one additional complication. At a real racetrack, the owners of the track first take a certain percent of the total amount wagered, and then redistribute whatever money is left to the winning bettors in proportion to the amount they bet.

Every bet in a conventional pari-mutuel market has an equal payoff. It doesn't matter if the bet is the first bet on the outcome or the last. It doesn't matter how much money has been wagered so far on the outcome at the time the bet is placed. All that matters is the final amount bet on all the outcomes when the market is closed. So really there is no incentive to bet early: it is better to wait until the last minute, in case any new information is revealed, and to get the best idea of what the payouts will be. This is in contrast to environments such as a stock market, where incentives exist to invest any time information changes or new information is revealed, and investing in a stock before everyone else does, when the price is lower, yields a better payout than investing after everyone else, when the price is higher.

A stock market typically operates as a continuous double auction (CDA). A continuous double auction (CDA) constantly matches orders to buy an asset with orders to sell. If at any time one party is willing to buy one unit of the asset at a bid price of $p_{bid}$, while another party is willing to sell one unit of the asset at an ask price of $p_{ask}$, and $p_{bid}$ is greater than or equal to $p_{ask}$, then the two parties transact (at some price between $p_{bid}$ and $p_{ask}$). If the highest bid price is less than the lowest ask price, then no transactions occur. In a CDA, the bid and ask prices rapidly change as new information arrives, and traders reassess the value of the asset. Since the auctioneer only matches willing bidders, the auctioneer takes on no risk. However, buyers can only buy as many shares as sellers are willing to sell; for any transaction to occur, there must be a counterparty on the other side willing to accept the trade.

When few traders participate in a CDA, it may become illiquid, meaning that not much trading activity occurs. The spread between the highest bid price and the lowest ask price may be very large, discouraging trading. One way to induce liquidity is to provide a market maker who is willing to accept a large number of buy and sell orders at particular prices. Conceptually, the market maker is just like any other trader, but typically is willing to accept a much larger volume of trades. The market maker may be a person, or may be an automated algorithm. Adding a market maker increases liquidity, but exposes the market maker to risk. Depending on what happens in the future, the market maker may lose considerable amounts of money.

In a conventional pari-mutuel market, anyone can place a wager of any amount at any time—there is in a sense infinite liquidity. Moreover, since money is only redistributed among traders/bettors, the market institution itself takes on no risk. The main drawback of a conventional pari-mutuel market is that it is useful only for capturing the value of an uncertain asset at some instant in time. It is ill suited for situations where information arrives over time, continuously updating the estimated value of the asset—situations common in almost all trading and wagering scenarios. There is no notion of "buying low and selling high", as occurs in a CDA, where buying when few others are buying (and the price is low) is rewarded more than buying when many others are buying (and the price is high). Perhaps for this reason, in most dynamic environments financial markets operating according to the CDA model, which can react in real-time to changing information, are more typically employed to facilitate trading and hedging.

Another conventional market model is the typical Las Vegas bookmaker or oddsmaker. In this case, the market institution (the "book" or "house") sets the odds, initially according to expert opinion, and later in response to the relative level of betting on the various outcomes. Whenever a wager is placed, the odds or terms for that bet are fixed at the time of the bet. While odds may change in response to changing information, any bets made at previously set odds remain in effect according to the odds at the time of the bet. This market is similar to the CDA with market maker model. The bookmaker accepts nearly all bets at any time at the current odds, though the bookmaker may change the odds in response to new information or relative betting volume. Like a market maker, the bookmaker exposes itself to risk. Depending what wagers were made at what odds, and depending on the outcome of the event being wagered on, the bookmaker may actually lose a considerable amount of money.

U.S. Pat. No. 5,687,968 discusses the problems associated with conventional pari-mutuel wagering and the bookmaker model. It suggests, instead of a single central market, a plurality of individual pari-mutuel markets with respective time periods ending at a different instant in time and fixing the odds after time period of each individual pari-mutuel market has ended. Bets made at the closing of each time period are paid at the odds of that period (and not the final odds). See FIG. 1. But this would have the disadvantage that it would thin out trading in each individual market, and would require a more complicated infrastructure than a single central market. Also, in each individual pari-mutuel market, the incentives would be to wait to bet until just before the ending time of that particular market. One possible way to alleviate this problem would be to have many individual pari-mutuel markets, and to institute a random stopping rule for each individual pari-mutuel market.

Robin Hanson, "Combinatorial information market design", Information Systems Frontiers, 5(1), 2002, describes a market mechanism called a market scoring rule. The mechanism maintains a probability distribution over all possible future outcomes. At any time, any trader who believes the probabilities are wrong can change any part of the distribution by accepting a lottery ticket that pays off according to a scoring rule (e.g., the logarithmic scoring rule described in Robert L. Winkler and Allan H. Murphy, "Good probability assessors", Journal of Applied Meteorology", 7: 751-758, 1968), as long as that trader also agrees to pay off the most recent person to change the distribution. The market interface can be made to look to traders like a continuous double auction with a market maker who is always willing to accept a bid on any outcome at some price. Since the market essentially always has a complete set of posted prices for all possible outcomes, the mechanism avoids the problem of thin or illiquid markets. However, the mechanism requires a patron to pay off the final person to change the distribution. It involves risk on the part of the market maker or patron, although the patron's payment is bounded. Hanson's method is not pari-mutuel in nature, meaning that payoffs are not necessarily redistributive and the amount of money won is not necessarily balanced by the amount lost.

BRIEF SUMMARY

The preferred embodiments of the invention relate to a new type of electronic market or auction for speculating on the outcome of a future event or on assets of uncertain value. The market may be used to speculate by investing or betting that a particular outcome will occur in the future or to hedge against undesireable outcomes, by arranging for insurance or compensation in case an undesireable outcome occurs.

The preferred embodiments of the invention may be utilized in various areas of finance, such as auctions, financial markets, financial instruments, information markets, futures markets, financial derivatives, risk management, insurance and hedging tools. They may also be utilized in gambling, such as in pari-mutuel markets, pari-mutuel wagering, betting, wagering, bookmaking, oddsmaking, in-game sports betting, in-running or dynamic betting. The preferred embodiments may also be utilized in a concept futures marketplace where people can speculate on the future value of concepts important to online e-commerce, and where "value" is defined based on statistics from auction data and web search data.

In a dynamic pari-mutuel market according to the preferred embodiments of the invention, each dollar bet may have a different payoff, depending on the status of wagering at the time of the bet. So a bet on a horse Alice when most people think a different horse will win (as reflected in their bets), will have a bigger payout than a bet on that same horse when most people agree that that horse will win. The payoff of each dollar bet may depend on the amount of money wagered at the time on the various outcomes or it may depend on the time of the bet, or the relation of the bet with other bets in time or amount. There are many ways for assigning differential pari-mutuel payoffs to bets, and any one may be used in the preferred embodiments. Generally, the pari-mutuel payoff of bets in the preferred embodiments of the invention depends on the status of wagering at the time of the bet, not just on the status of wagers at the market's close.

The preferred embodiments combine some of the advantages of existing market models for trading and hedging. Three desirable properties for any market for trading uncertain assets are: (1) guaranteed liquidity—any number of trades/wagers are allowed at any time; (2) no risk of losing money for the market institution itself (the amount paid out is never more than the amount collected from losing wagers, including losing seed or ante wagers), regardless of what outcomes occur; and (3) the payout on any trade/wager depends on the status of wagering at the time of the trade. This last property is important in any situation where new information may arrive over time.

A dynamic pari-mutuel market according to the preferred embodiments of the invention combines many of the benefits of previously existing markets. Like the pari-mutuel market, there is essentially infinite liquidity. Like the CDA and pari-mutuel markets, the auctioneer assumes no risk. And like the CDA and bookmaker markets, the payout depends on the status of wagering at the time of the bet, and so the market can react in a meaningful and reasonable way to changing information or new information. It is very well suited for supporting trading and hedging, and providing accurate forecasts of future events. It simultaneously: (1) allows traders to buy in for any amount at any time, (2) is risk-free for the market institution, and (3) reacts well to changing information. Although several existing market mechanisms have two of these three properties, only the preferred embodiments of the invention have all three.

The markets in the preferred embodiments differ from conventional pari-mutuel markets at least in that the pari-mutuel payoffs depend on the status of wagering at the time of the bet. This allows the market to react well to changing information. The market differs from a CDA in that there is always some price at which traders can buy into the market—there does not need to be a matching seller in order for a transaction to occur. The market also differs from a CDA with market maker, and a bookmaker, in that the market institution takes no risk-money is only redistributed among participants, and the market itself cannot lose money.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention. Furthermore, although the drawings illustrate a pari-mutuel wagering embodiment, it is to be understood that the illustrated method of speculating can be applied to any one of the plurality of different electronic markets described elsewhere in this application.

In an electronic market according to the preferred embodiments, the payoff for any particular bet changes according to the status of wagering at the time of the bet. This variable and dynamic payoff for the bet can be expressed by saying that the amount of money corresponding to the bet will buy a number of shares in one outcome or another. Making a bet is tantamount to purchasing shares and entitles the person making the bet to own the shares in the winning pot should the chosen outcome occur. The payoff is variable and dynamic, because when few people are betting on an outcome, shares will generally be cheaper than at a time when many people are betting that outcome. Anyone at any time can buy a share in any outcome at the going price (guaranteed liquidity), but the price may change as a result of the purchase.

Figure 1:
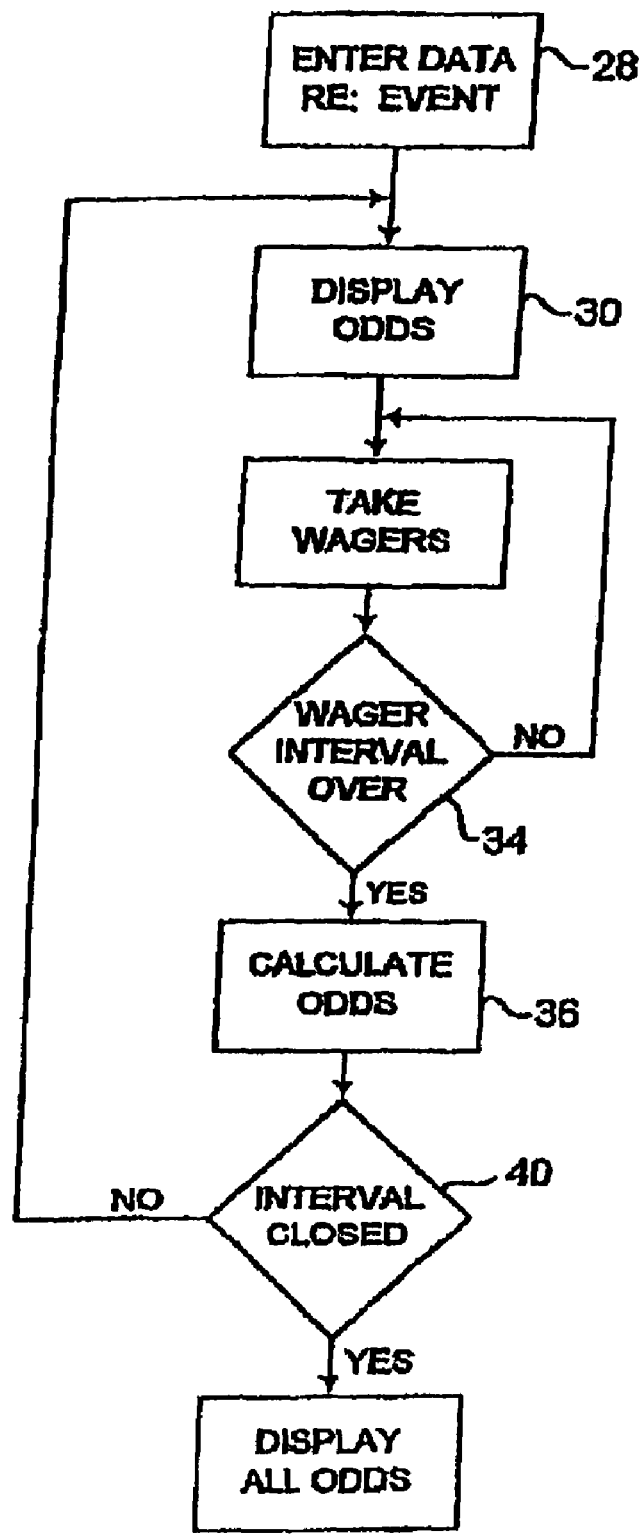
FIG. 1 illustrates a prior art method of performing pari-mutuel wagering.
Figure 2:
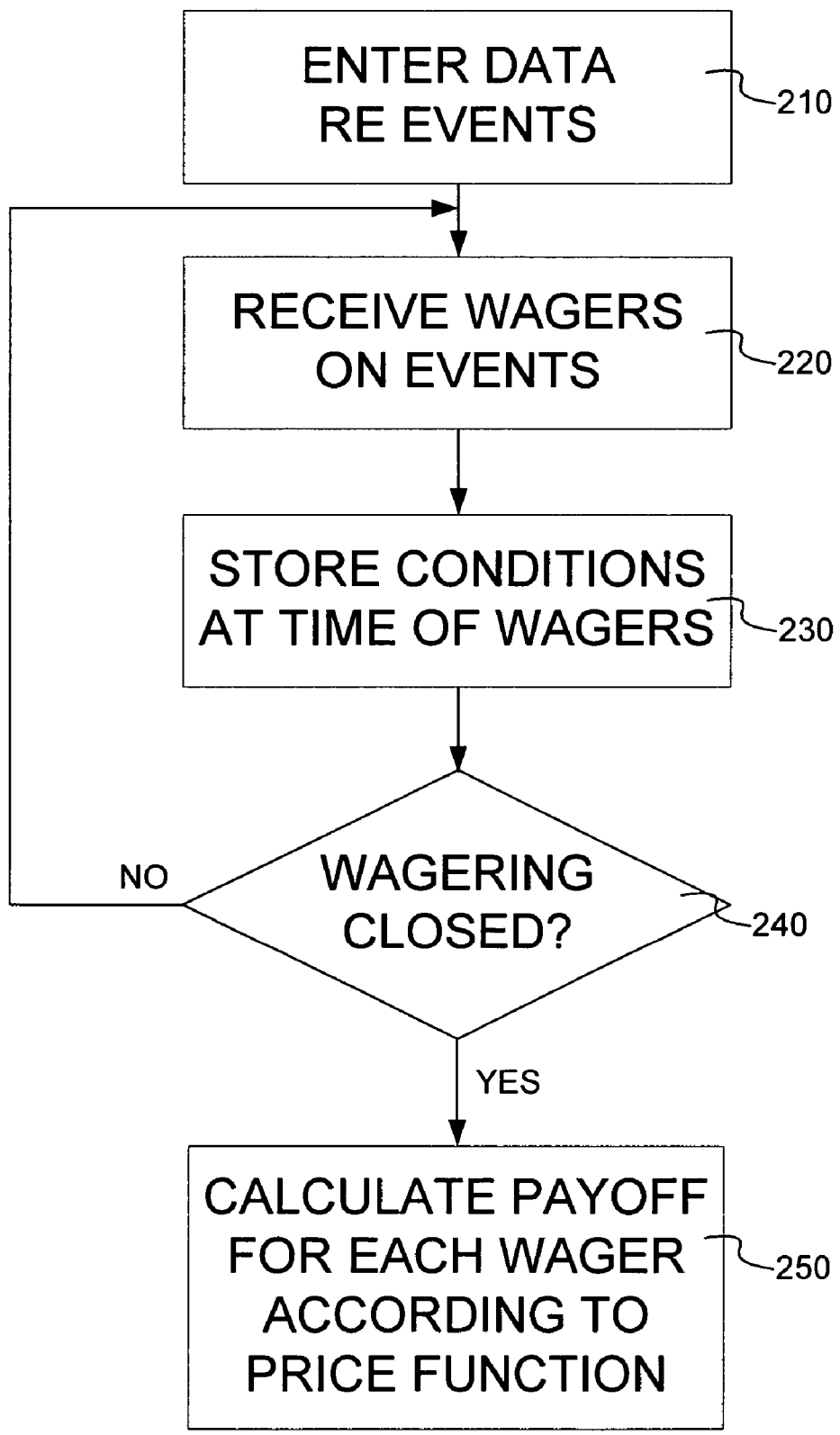
FIG. 2 illustrates a method of performing dynamic pari-mutuel wagering according to a preferred embodiment of the invention.

This method is illustrated in FIG. 2. At step 210, data regarding the events and possible outcomes is entered into the electronic market system and is made available to users. The data may be entered in any manner known in the art or hereafter developed. The market system then receives wagers on the events and possible outcomes (step 220). The users may enter wagers and the wagers may be received and saved by the electronic market in any manner known in the art or hereafter developed. However, the information saved for a wager does not consist merely of the amount and outcome bet on by the user. At step 230, the conditions existing at the time at which the wager is received is also recorded (step 230). As described further below, the payoff for the wager will depend not only upon the amount and outcome, but also upon the conditions at the time the wager was received. As known in the art, wagers may be received only up until a designated time (step 240) and thereafter no additional wagers will be accepted. Only after the time for making wagers has ended is the payoff for each wager calculated according to the method of the invention (step 250).

The full amount paid as the payoff on a wager in step 250 is the integral (or discrete approximation of the integral) of the price, integrated from 0 to k shares, where k is the number of shares purchased. There are many different ways to formulate the price function. Four different embodiments of these price functions are described below. However, any price function utilized in step 250, and indeed any pari-mutuel method where the payoff of a bet depends on the status of wagering at the time of the bet, may be utilized.

In calculating the payoff in a binary outcome situation, there are four important numbers (for convenience, call the two possible outcomes "Outcome1" and "Outcome2"): the per-share price of Outcome1, the payoff per share of Outcome1, the per-share price of Outcome2, and the payoff per share of Outcome2. In the following description of the preferred embodiments, the amount of money bet on Outcome1 is denoted as A, and the amount of money bet on Outcome2 is denoted as B. The number of shares of Outcome1 purchased is denoted as $N_a$, and the number of shares of Outcome2 purchased is denoted as $N_b$.

The first preferred embodiment is as follows. If Outcome1 wins, all money wagered on Outcome1 is refunded, while money wagered on Outcome2 is redistributed to the winners in proportion to the number of shares they own. So, if Outcome1 wins, each share of Outcome1 returns the initial price paid, plus $B/N_a$ dollars. Different price functions result in different markets with various properties. For the moment, assume that the per-share price of Outcome1 is equal to the payoff per share of Outcome2. By solving the implied differential equations, one can show that this leads to the following price functions:

$$\text{share price of } Outcome1 = \frac{A}{N_b} e^{k/N_b}$$

$$\text{share price of } Outcome2 = \frac{B}{N_a} e^{k/N_a}$$

where k is the number of shares purchased. To determine the total amount required to purchase k shares, we integrate over price from 0 to k, obtaining:

$$\cos t \text{ to buy } k \text{ shares of Outcome1} = A(e^{k/N_b} - 1)$$

$$\cos t \text{ to buy } k \text{ shares of Outcome2} = B(e^{k/N_a} - 1)$$

One can also make the costs discrete, so that for example lots of 100 shares can be purchased at some constant price—thus making it look to traders more like a typical CDA or stock market with a number of ask orders at various prices automatically available.

One can also compute the implied "market probability" of Outcome1, or the probability $$\text{market probability of } Outcome1 = \frac{AN_a}{AN_a + BN_b}$$

that Outcome1 will win as implied by the current market situation. This probability is: and similarly for Outcome2. If one uses the above price equations, then the market dynamics will be such that the (instantaneous) price of Outcome1 equals the payoff of Outcome2, and the price of Outcome2 equals the payoff of Outcome1. In this circumstance, there are actually only two numbers to keep track of instead of four.

In the second embodiment, as in the first embodiment, if Outcome1 wins, all money wagered on Outcome1 is refunded, while money wagered on Outcome2 is redistributed to the winners in proportion to the number of shares they own. However, the price of Outcome1 divided by the price of Outcome2 is equal to A/B. This is a particularly natural way to set the price. By solving the implied differential equations, one can show that this leads to the following price function:

$$\text{share price of } Outcome1 = \frac{Ae^{2\sqrt{\frac{Na+k}{Nb}} - 2\sqrt{\frac{Na}{Nb}}}}{\sqrt{(Na+k)N_b}}$$

and similarly for Outcome2. Notice that the instantaneous price of Outcome1 (for an infinitesimal number of shares) is equal to $A(N_a N_b)^{-1/2}$. To compute the total cost of purchasing k shares, integrate the price from 0 to k, which yields:

$$\text{cost to buy } k \text{ shares of } Outcome1 = A\left(e^{2\sqrt{\frac{Na+k}{Nb}} - 2\sqrt{\frac{Na}{Nb}}} - 1\right)$$

and similarly for Outcome2. One can also compute the implied "market probability" of Outcome1, or the probability that Outcome1 will win as implied by the current market situation. This probability is:

$$\text{market probability of } Outcome1 = \frac{A\sqrt{N_a}}{A\sqrt{N_a} + B\sqrt{N_b}}$$

and similarly for Outcome2. If one uses the above price equations, then the market dynamics will be such that the (instantaneous) price of Outcome1 divided by the price of Outcome2 (priceA/priceB) always equals the amount bet on Outcome1 divided by the amount bet on Outcome2 (A/B). This seems a natural way for prices to change, since the more money is bet on one side, the cheaper becomes a share on the other side, in exactly the same proportion.

In the third embodiment, if Outcome1 wins, all money wagered on both sides is redistributed to those who bet on Outcome1, in proportion to the number of shares they own. So, if Outcome1 wins, each share of Outcome1 returns $(A+B)/N_a$ dollars. This differs from the first and second embodiments, where only the losing money is redistributed and all winning bets are refunded. In the third embodiment, no money is explicitly refunded; rather all money wagered is redistributed to owners of shares of Outcome1. Now assume that the price of Outcome1 divided by the price of Outcome2 is equal to A/B, as in mechanism 2. By solving the implied differential equations, one can show that this leads to the following price function:

$$\text{share price of } Outcome1 = \frac{B(A+B)(A+m)}{B(A+m)N_a + B(B-m)N_b + (A+B)(A+m)N_b \ln\left(\frac{(A+B)(A+m)}{A(A+B+m)}\right)}$$

where m is the amount of money wagered (the price function cannot be solved in closed-form for k). One can derive an analogous price equation for Outcome2.

One can also compute the implied "market probability" of Outcome1, or the probability that Outcome1 will win as implied by the current market situation. This probability is:

$$\text{market probability of } Outcome1 = \frac{AN_a}{AN_a + BN_b}$$

and similarly for Outcome2. Note that this is the same market probability equation implied by the first embodiment. If one uses the above price equations, then the market dynamics will be such that the (instantaneous) price of Outcome1 divided by the price of Outcome2 (priceA/priceB) always equals the amount bet on Outcome1 divided by the amount bet on Outcome2 (A/B). This seems a natural way for prices to change, since the more money is bet on one side, the cheaper becomes a share on the other side, in exactly the same proportion.

There are advantages and disadvantages of redistributing all money (third embodiment) as opposed to redistributing losing money only (first and second embodiments). The main advantage is that every share is worth exactly the same amount, so there can be a natural aftermarket, where traders can sell their shares at market value or slightly below market value. In this way, traders can "cash out" early, before the event outcome is known, and still lock in a profit (or limit their loss). The disadvantage is that winning bets may actually lose money. If someone buys shares of Outcome1 at too high a price, and later many people buy in at much lower price, then that person may actually lose money, even though they bet on Outcome1, the eventual winner. When winning bets are refunded first, and only losing money is redistributed, then all winners are guaranteed to at least break even. However, with the first and second embodiments, each share is worth a different amount, depending on how much was paid for it, so it is not a simple matter to set up an aftermarket.

An aftermarket is an important, but not mandatory, feature of the third embodiment where all money is redistributed. Every share has exactly the same payout at any given moment. So it is a simple matter to set up an aftermarket, where people can sell their shares at market value, or slightly below market value, using a "limit price" as used in the stock market. In this way, people can "buy low and sell high", cashing out their profits before the result of the outcome is determined (once the outcome is known, all shares cash out). For the first and second embodiments, each share of the winning outcome is worth the initial price paid plus a stake of the money bet on the losing outcome. So each share is worth a different amount, depending on how much was paid for it. Therefore the natural way to implement an aftermarket is not obvious. One possible aftermarket would work as follows. Let's say I buy 1 share of Outcome1 for $5. Later, the price of Outcome1 moves to $10. I can then "sell" ½ share at market price (½ share for $5), receiving all of my initial $5 investment back, and retaining ½ share of Outcome1. The ½ share is worth either some positive amount, or nothing, depending on the outcome and the final payoff. So I am left with shares worth a positive expected value and all of my initial investment. Essentially I have "cashed out" and locked in my gains—I cannot lose but I may win. Now suppose instead that prices move to $2 per share for Outcome1. Right now I own one share of Outcome1 plus a lottery ticket that pays $5 if Outcome1 wins (my initial investment refunded), and nothing otherwise. I decide to cash out and limit my losses. In this case, I can sell my 1 share for $2. The buyer gets the 1 share plus a lottery ticket that pays $2 (the buyer's price refunded) if Outcome1 wins, and nothing otherwise. I get the $2 plus what remains of the lottery ticket for myself: a lottery ticket worth $3 if Outcome1 wins, and nothing otherwise. Now my loss is limited to $3 at most instead of $5. If Outcome1 wins, I break even; if Outcome1 loses, I lose $3. One might then imagine two additional aftermarkets where people can (1) sell their leftover shares after they have cashed out with a win, and (2) sell their leftover lottery tickets after they have cashed out with a loss. It may also possible to automate these two aftermarkets, by automatically bundling them together in the correct ratio and selling them in the central market. In this way, traders can cash out completely, receiving everything in dollars, rather than contingent dollars or shares whose payoffs depend on the outcome. Note that this automatic bundling happens behind the scenes, so as far as the trader is concerned, he or she is simply selling back the same item that was originally purchased, at the current market price.

An aftermarket is important in order to let people lock in gains or limit losses. Also, with the existence of an aftermarket, prices should be unpredictable (change according to a random walk), for the same reasons as for the efficient markets hypothesis common in the financial literature. Then, for at least the first embodiment, since the payoff of Outcome2 equals the price of Outcome1 and vice versa, the payoffs should also follow a random unpredictable walk as well.

The above equations assume that all money that comes in is eventually returned or redistributed. In other words, the mechanism is a zero sum game, and the market institution takes no portion of the money. This could be generalized so that the market institution always takes a certain initial amount, or a certain initial percent, or a certain periodic amount, or a certain periodic percent, or a certain amount per transaction, or a certain percent per transaction, or a certain amount per share, or a certain percent per share, before money in returned or redistributed. Also note that the above price functions are undefined when the amount bet or the number of shares are zero. So the system must begin with some positive amount on both sides, and some positive number of shares outstanding on both sides. These initial amounts could be funded as a subsidy from the market institution, called a seed wager, or from a portion of the fees charged, called an ante wager.

A fourth preferred embodiment does not involve prices or shares. It is more similar to a continuous version of a repeated pari-mutuel market. People bet any amount on either outcome at any time. Once the outcome is determined, bets are marked as winners or losers. Winning bets are refunded. Losing bets are redistributed to the winners in proportion to some inverse function of the distance in time between the losing bet and the winning bet. With this mechanism, if you win, your money comes mainly from those who traded close to you in time. In this way, if a winning bet took place at a time when many others were placing losing bets, that person will win more than someone who placed their bet at a time when many others were placing winning bets. Another alternative would be to distribute losing bets to winners who traded before them only; in this way, if you win, your winnings come from those who traded after you only, in inverse proportion to how long after you they traded. Or losing bets could be redistributed forward in time only. In a variation of this embodiment, all money would be redistributed, not just losing money.

There are many other possible embodiments beyond the four embodiments described above. Some natural extensions of these embodiments would handle more than two outcomes, or a continuous range of outcomes. There are also many other ways to derive price functions. Finally, the conceptual use of "shares" and "prices" is intended to provide a familiar and well-understood interface for communicating the differential-payoff mechanism to traders, but one might imagine other ways to go about explaining or implementing a differential-payoff pari-mutuel embodiment.

Furthermore, the embodiments are described above with reference to financial or wagering markets, which are well known in the art and need not be described in detail herein. However, a further application of the preferred embodiments is in a concept futures market associated with online e-commerce or other networked computer systems. Such a market is described in U.S. patent application Ser. No. 10/625,082 filed on Jul. 22, 2003, entitled "Term-Based Concept Market", and commonly assigned to Overture Services, Inc, which patent application is hereby incorporated by reference in its entirety as if fully set forth herein.

In online e-commerce, term-based search engines or search portals are used by consumer users to obtain search results relating to the users' topics of interest as expressed by search terms. Search results can include, for example, a list of hits, each hit including a short description relating to a Web site as well a clickable or otherwise selectable link to a Web site. In this way, an Internet user can click through to a Web site where goods, services, or content of interest to the user may be found. Transactions may be conducted at the found Web site or a related Web site, such as the purchase or sale of goods, services or content, or trade. Search results may be provided based on various criteria, such as by being based on the presence of search terms in Web site addresses or content.

Terms used in computerized searches, and the topics, themes, or concepts to which the terms relate, can indicate important consumer interests and trends. Such trends and their future directions, as indicated by search terms, are naturally of interest to the public generally, and can also have a substantial impact on businesses economically, affecting advertising strategies and costs as well as the success and quantity of sales and other business activities, which are often associated with consumer interests and trends. Future consumer interests and trends can also be difficult to predict, leaving businesses with difficult to predict advertising costs, sales, etc. Businesses could benefit from a way to reduce the hardship caused by such unpredictability, or, where it is believed that a good prediction is available, to capitalize on it. In addition, businesses and the public alike have interest in predicting future consumer interests and trends, as indicated by search terms, whether for economic or advertising reasons, or for reasons relating to personal interest and the enjoyment of attempting to predict such things as what the next "hot" entertainer will be, what singer's current popularity will soon be on the downslide, what the next consumer electronics rage will be, etc.

In the case of sponsored search portals, search results can be provided based on arrangements made be owners or operators of Web sites with the owner or operator of one or more search portals, or with an entity able to make arrangements with such search portals. For example, the owner of a Web site at which particular goods, services or content are sold might pay the search portal owner, or the another entity, to arrange for a hit, advertisement, or sponsored link relating to the Web site to appear among the search results for searches that include a term or terms that might indicate an interest in the offered goods, services, or content. In some embodiments, the search portal owner or operator, or other entity making such arrangements, is an owner or operator of, or is otherwise associated with, the market in concept-based instruments and any computer hardware or software used to facilitate transactions in the market, as described below.

In some instances, auctions are conducted in which Web site owners can bid on the position or prominence, or rank, of their advertisement or sponsored link in search results for a given search term or set of terms. In Pay-Per-Click or related types of arrangements, Web site owners who pay for an advertisement or link to their Web site to be featured in search results for a certain search term or terms may pay, for example, based on the number of users who click on their featured link.

Herein, the term "instrument" can include any vehicle, embodiment, or indicator of any interest, property, rights, privileges or benefits of any kind, including bets, and is not limited to formal written, documented or otherwise memorialized expressions, vehicles, embodiments or indicators. Herein the term "term" can include, for example, one or more characters, character strings, letters, words, phrases, abbreviations, sentences, or symbols of any kind. Herein, the term "concept" includes any group of one or more terms, but can, in some embodiments, include themes or abstractions that are not term-based. In some embodiments, a concept includes a group of terms that relate to a common theme. Herein, the term "concept market" includes markets that include concepts or instruments relating to concepts or terms of concepts.

Figure 3:
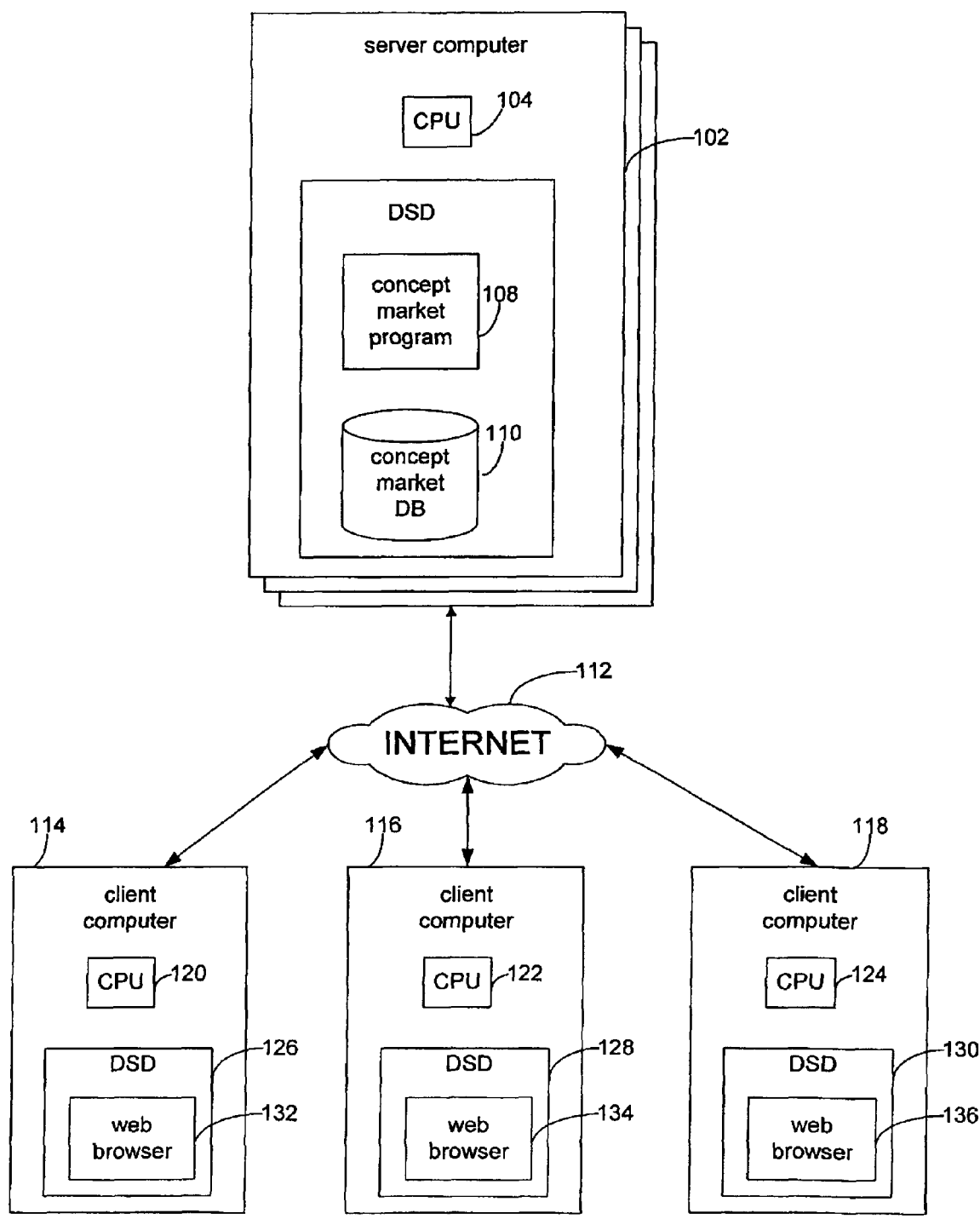
FIG. 3 is a block diagram of a distributed computer system in which a method according to an embodiment of the invention may be implemented.

FIG. 3 is a block diagram of a distributed computer system 100 incorporating a concept market program 108, according to one embodiment of the invention. In the computer system 100 depicted in FIG. 3, one or more server computers 102 is connected to one or more client computers 114, 116, 118 via the Internet 112. While the Internet 112 is depicted, the network connecting the computers can broadly include any of, or an array of, networks, which can include wired or wireless networks, cellular telephone networks, one or more local area networks, one or more wide area networks, and may also include a connection to the Internet, although embodiments of the invention are contemplated in which no connection to the Internet is provided.

Each of the client computers 114, 116, 118 comprises one or more Central Processing Units (CPUs) 120, 122, 124, and one or more data storage devices 126, 128, 130 which may include one or more network or Internet Browser programs 132, 134, 136.

The server computer 102 comprises one or more CPUs 104 and one or more data storage devices 106. The data storage device 106 comprises a concept market program 106 and one or more concept market databases 110, which can be a relational database or other type of database. While, as depicted, the concept market database 110 is located within the server computer 102, the invention contemplates embodiments in which the concept market database 110 is located completely or partially exterior to the server computer 102, and embodiments in which the concept market database 110 is distributed among multiple data stores and locations.

The data storage devices 106, 126, 128, 130 may comprise various amounts of RAM for storing computer programs and other data. In addition, both the server computer 102 and the client computers 114, 116, 118 may include other components typically found in computers, including one or more output devices such as monitors, other fixed or removable data storage devices such as hard disks, floppy disk drives and CD-ROM drives, and one or more input devices, such as keyboards, mouse pointing devices, or other pointing or selecting devices.

Generally, both the server computer 102 and the client computers 114, 116, 118 operate under and execute computer programs under the control of an operating system, such as Windows, Macintosh, UNIX, etc. In the embodiment shown, the invention is implemented using the concept market program 108 executed from the server computer 102, although in alternative embodiments the concept market program 108 could be located or executed elsewhere. The concept market program 106 broadly represents all programming, applications, software, or other tools used to facilitate implementing the methods of the invention as described herein.

Generally, the computer programs of the present invention are tangibly embodied in a computer-readable medium, e.g., one or more data storage devices attached to a computer.

Under the control of an operating system, computer programs may be loaded from data storage devices into computer RAM for subsequent execution by the CPU. The computer programs comprise instructions which, when read and executed by the computer, cause the computer to perform the steps necessary to execute elements of the present invention.

In various embodiments of the invention, users of the client computers 114, 116, 118 can transact in concept-based instruments with each other, or with a market, which can include one or more organizations, exchanges, books, gambling houses or organizations, or can transact with both. In some embodiments, the market can be associated with the server computer 102, the concept market database 110, or both. Access to the server computer 102, or a market provided by the server computer 102, can be public, or can be private or secure. In some embodiments, access is secured by one or more firewalls, password protection, or public, private key encryption, or by other means.

Figure 4:
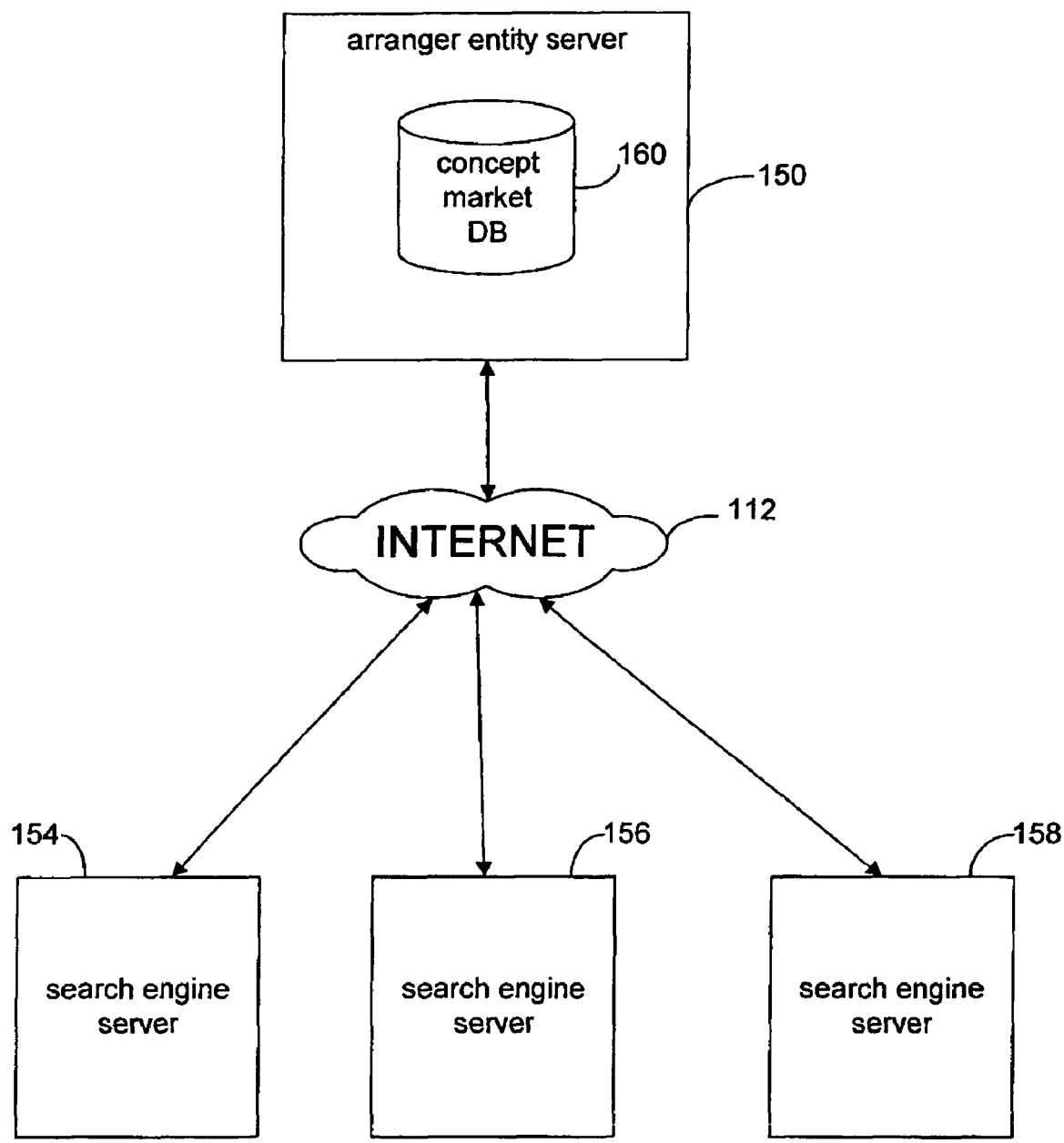
FIG. 4 is a block diagram of a distributed computer system in which a method according to an embodiment of the invention may be implemented.

FIG. 4 is a distributed computer system 148 according to one embodiment of the invention. The system 150 includes an arranger entity computer 150 connected via the Internet 112, or some other network, to several search engine servers 154, 156, 158. The search engine servers 154, 156, 158 can be server computers associated with search engine or search portal owners or operators, and can provide search engines and search results to client computers that can be connected to the arranger entity server 150, the search engine servers 154, 156, 158, or both. The arranger entity computer can include the concept market program 108, as depicted in FIG. 3, and includes a concept market database 160, which can be one embodiment of the concept market database 110 as depicted in FIG. 3.

In some embodiments, an arranger entity, associated with the arranger entity server 150, makes arrangements in connection with search engine or portal servers or systems, such as for example, the search engine servers 154, 156, 158, or users thereof, and Web site owners or operators, or advertisers. For example, the arranger entity may facilitate providing sponsored links to Web sites or advertisements as part of search results provided to users of client computers that perform term-based computerized searches using a search engine provided by one or more of the search engine servers 154, 156, 158 (for more detail on some embodiments of systems including arranger entities, see the "Payoff Output" section in the afore-mentioned patent application incorporated by reference). One example of an arranger entity is Overture Services, Inc., providing Internet-based computerized search-related services and arrangements. In some embodiments of the invention, search-related data, which can include search term and search term usage data and statistics, is communicated from the search engine servers 154, 156, 158 to be stored in the concept market database 160. In some embodiments, the search-related data can include, for instance, Pay-Per-Click auction data and statistics, as described in the "Concept Value Measurement" section in the afore-mentioned patent application incorporated by reference.

The method of a preferred embodiment of the invention illustrated in FIG. 2 depict may be carried out by a software program executed on the server computer 102, in conjunction with users of the client computers 114, 116, 118. For example, the server computer 102 may provide a Web page or Web pages accessible by the client computers, through which transactions are facilitated.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computerized method of speculating on a future event in a market, the method comprising:
   presenting a user interface for speculating in the market;
   electronically identifying a plurality of initial wagers on the outcome of the future event;
   receiving, through the user interface, a plurality of speculation wagers on the outcome of said future event, wherein the speculation wagers are wagers received after the plurality of initial wagers;
   electronically associating, using a processing device, a real time market status for each of the speculation wagers at the time the given speculation wager is received, wherein said real time market status is a factor of a price function that determines: (1) at any given instant in time at or before the future event; and (2) for each respective possible outcome of the future event, the price for a desired number of shares of a payoff for that outcome should that outcome occur, wherein the payoff is a pari-mutuel payoff, wherein the market includes an electronic aftermarket for trading said shares; and
   after the occurrence of the future event:
      identifying each correct speculation wager from the plurality of speculation wagers received;
      identifying a wager or shares amount for each correct speculation wager; and
      utilizing the price function and the wager or shares amount to electronically calculate, using the processing device, the pari-mutuel payoff for each correct speculation wager, based on the associated real time market status at the time the speculation wager was received.

2. The method of claim 1 wherein the price function depends on the relative number of shares purchased for each respective possible outcome of said future event, and/or the relative amount of money speculated on each respective possible outcome of said future event.

3. The method of claim 2 wherein the money received from all incorrect speculation wagers is redistributed to the correct speculation wager, and the pari-mutuel payoff for each correct speculation wager on the outcome of said future event comprises a refund of the amount of the correct speculation wager plus a proportion of the money received and redistributed from all incorrect speculation wagers.

4. The method of claim 3, wherein the proportion in the pari-mutuel payoff for each correct speculation wager is equal to the proportion of the number of shares corresponding to the correct speculation wager to the total number of shares corresponding to all correct speculation wagers.

5. The method of claim 1 wherein said electronic aftermarket permits said shares to be traded before said future event occurs.

6. The method of claim 5 wherein the electronic aftermarket permits said shares to be traded using a limit price.

7. The method of claim 3 wherein the market includes a first electronic aftermarket for trading said shares and a second electronic aftermarket for trading said refunds.

8. The method of claim 7 wherein said first and second electronic aftermarkets permit said shares and said refunds to be traded before said future event occurs.

9. The method of claim 8 wherein the first and second electronic aftermarkets permit said shares and said refunds to be traded using a limit price.

10. The method of claim 6 wherein a combined electronic aftermarket permits a trader to trade both shares and refunds.

11. The method of claim 1 wherein the market receives a payment before money is redistributed to correct speculation wagers.

12. The method of claim 1 wherein said speculating comprises trading and said plurality of speculation wagers comprises a plurality of trades.

13. The method of claim 1 wherein said speculating comprises hedging or insuring, or some combination thereof.

14. A networked computer system facilitating speculations on a future event, the system comprising:
   one or more client computers connectable to a network;
   one or more server computers, connectable to the network, for facilitating speculations using the client computers; and
   a software program stored on one of said server computers which, when executed, causes said networked computer system to carry out a method of speculating on a future event, the method comprising:
      identifying a plurality of initial wagers on the outcome of the future event;
      receiving a plurality of speculation wagers on the outcome of said future event, wherein the speculation wagers are wagers received after the plurality of initial wagers;
      for each of the speculation wagers, associating a real time market status at the time that the speculation wager is received in said networked computer system, wherein said real time market status is a factor of a price function that determines: (1) at any given instant in time at or before the future event; and (2) for each respective possible outcome of said future event, the price for a desired number of shares of a payoff for that outcome should that outcome occur, wherein the payoff is a pari-mutuel payoff, wherein the market includes an electronic aftermarket for trading said shares; and
      after the occurrence of the future event:
         identifying each correct speculation wager from the plurality of speculation wagers received;
         identifying a wager or shares amount for each correct speculation wager; and
         utilizing the price function and the wager or shares amount to calculate the pari-mutuel payoff for each correct speculation wager, based on the associated real time market status at the time the speculation wager was received.

15. The computer system of claim 14 wherein the price function depends on the relative number of shares purchased for each respective possible outcome of said future event, and/or the relative amount of money speculated on each respective possible outcome of said future event.

16. The computer system of claim 15 wherein the money received from all incorrect speculation wagers is redistributed to the correct speculation wagers, and the pari-mutuel payoff for each correct speculation wager on the outcome of said future event comprises a refund of the amount of the correct speculation wager plus a proportion of the money received and redistributed from all incorrect speculation wagers.

17. The computer system of claim 16 wherein the proportion in the pari-mutuel payoff for each correct speculation wager is equal to the proportion of the number of shares corresponding to the correct speculation wager to the total number of shares corresponding to all correct speculation wagers.

18. The computer system of claim 14 wherein said aftermarket permits said shares to be traded before said future event occurs.

19. The computer system of claim 18 wherein the aftermarket permits said shares to be traded using a limit price.

20. The computer system of claim 16 wherein the computer system includes a first aftermarket for trading said shares and a second aftermarket for trading said refunds.

21. The computer system of claim 20 wherein said first and second aftermarkets permit said shares and said refunds to be traded before said future event occurs.

22. The computer system of claim 19 wherein said first and second aftermarkets permit said shares and said refunds to traded using a limit price.

23. The computer system of claim 19 wherein a combined aftermarket in the computer system permits a trader to trade both shares and refunds.

24. The computer system of claim 14 wherein the operator of the computer system receives a payment before money is redistributed to correct speculation wagers.

25. The computer network of claim 14 wherein said speculating comprises trading and said plurality of speculation wagers comprises a plurality of trades.

26. The computer network of claim 14 wherein said speculating comprises hedging or insuring, or some combination thereof.

27. A computer usable medium storing a computer program which, when executed on a computer, causes the computer to execute a method of speculating on a future event, the method comprising:

identifying a plurality of initial wagers on the outcome of the future event;

receiving a plurality of speculation wagers on the outcome of said future event in a market, wherein speculation wagers are wagers received after the plurality of initial wagers;

for each of the speculation wagers, associating a real time market status at the time that the speculation wager is received in said market, wherein said real time market status is a factor of a price function that determines; (1) at any given instant in time at or before the future event; and (2) for each respective possible outcome of said future event, the price for a desired number of shares of a payoff for that outcome should that outcome occur, wherein the payoff is a pari-mutuel payoff, wherein the market includes an electronic aftermarket for trading said shares;

after the occurrence of the future event:

identifying each correct speculation wager from the plurality of speculation wagers received;

identifying a wager or shares amount for each correct speculation wager; and utilizing the price function and the wager or shares amount to calculate the pari-mutuel payoff for each correct speculation wager, based on the associated real time market status at the time the speculation wager was received.

28. The computer usable medium of claim 27 wherein the money received from all incorrect speculation wagers is redistributed to the correct speculation wagers, and the pari-mutuel payoff for each correct speculation wager on the outcome of said future event comprises a refund of the amount of the correct speculation wager plus a proportion of the money received and redistributed from all incorrect speculation wagers.

29. The computer usable medium of claim 27 wherein the proportion in the pari-mutuel payoff for each correct speculation wager is equal to the proportion of the number of shares corresponding to the correct speculation wager to the total number of shares corresponding to all correct speculation wagers.

30. The computer usable medium of claim 27 wherein said aftermarket permits said shares to be traded before said future event occurs.

31. The computer usable medium of claim 30 wherein said aftermarket permits said shares to be traded using a limit price.

32. The computer usable medium of claim 28 wherein the market includes a first aftermarket for trading said shares and second aftermarket for trading said refunds.

33. The computer usable medium of claim 32 wherein said first and second aftermarkets permit said shares and said refunds to be traded before said future event occurs.

34. The computer usable medium of claim 33 wherein the first and second aftermarkets permit said shares and said refunds to be traded using a limit price.

35. The computer usable medium of claim 34 wherein a combined aftermarket permits a trader to trade shares using a limit price before said future event occurs.

36. The computer usable medium of claim 27 wherein said speculating comprises trading and said plurality of speculation wagers comprises a plurality of trades.

37. The computer usable medium of claim 27 wherein said speculating comprises hedging or insuring, or some combination thereof.

* * * * *